(12) United States Patent
Yoon et al.

(10) Patent No.: US 10,451,918 B2
(45) Date of Patent: Oct. 22, 2019

(54) DISPLAY PANEL AND DISPLAY DEVICE INCLUDING THE SAME

(71) Applicant: Samsung Display Co., Ltd., Yongin-si, Gyeonggi-do (KR)

(72) Inventors: Hyungguen Yoon, Hwaseong-si (KR); Jaehong Park, Seoul (KR); Jiyun Park, Hwaseong-si (KR); Kyunghee Lee, Suwon-si (KR); Jaebok Chang, Incheon (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 15/978,006

(22) Filed: May 11, 2018

(65) Prior Publication Data
US 2019/0107752 A1    Apr. 11, 2019

(30) Foreign Application Priority Data

Oct. 11, 2017  (KR) ........................ 10-2017-0131660

(51) Int. Cl.
| | | |
|---|---|---|
| *G02F 1/1347* | (2006.01) | |
| *G02F 1/1335* | (2006.01) | |
| *G02F 1/1343* | (2006.01) | |

(52) U.S. Cl.
CPC ...... *G02F 1/133528* (2013.01); *G02F 1/1343* (2013.01); *G02F 1/1347* (2013.01);
(Continued)

(58) Field of Classification Search
CPC ...... G02F 1/133; G02F 1/1334; G02F 1/1335; G02F 1/133528; G02F 1/134363;
(Continued)

(56) References Cited

U.S. PATENT DOCUMENTS

| | | |
|---|---|---|
| 6,307,556 B1 | 10/2001 | Ellenby et al. |
| 8,007,876 B2 | 8/2011 | Wu et al. |

(Continued)

FOREIGN PATENT DOCUMENTS

| | | |
|---|---|---|
| JP | 2009-236987 A | 10/2009 |
| KR | 10-2014-0088470 | 7/2014 |

(Continued)

*Primary Examiner* — Thoi V Duong
(74) *Attorney, Agent, or Firm* — Lewis Roca Rothgerber Christie LLP

(57) ABSTRACT

A display device includes a display panel and a light source providing light to the display panel. The display panel includes a first polarizing layer to which the light is incident, a first base layer disposed on the first polarizing layer, a first liquid crystal layer disposed on the first base layer and including a plurality of first nanocapsules, a second liquid crystal layer disposed on the first liquid crystal layer and including a plurality of second nanocapsules, a second polarizing layer disposed between the first liquid crystal layer and the second liquid crystal layer, a second base layer disposed on the second liquid crystal layer, and a third polarizing layer disposed on the second base layer. Each of the first and second liquid crystal layers controls a transmittance of the light based on an intensity of an electric field between pixel electrodes and a common electrode.

20 Claims, 13 Drawing Sheets

(52) U.S. Cl.
CPC .. *G02F 1/133514* (2013.01); *G02F 1/134363* (2013.01); *G02F 2201/121* (2013.01); *G02F 2201/123* (2013.01)

(58) Field of Classification Search
CPC ...... G02F 1/1347; G02F 1/136; G02F 1/1368; G02F 1/133514; G02F 1/134309; G02F 1/133707; G02F 1/1393; G02F 1/1343; G02F 1/134336; G02F 1/1336; G02F 1/133602; G02F 1/133603; G02F 1/133609; G02F 1/1333; G02F 2202/36; G02F 2001/133531; G02F 2001/134345; G02F 2201/121; G02F 2201/123; G02F 2201/52; C09K 19/42; C09K 19/544
See application file for complete search history.

(56) References Cited

U.S. PATENT DOCUMENTS

| | | | |
|---|---|---|---|
| 9,099,046 B2 | 8/2015 | Whitehead et al. | |
| 9,104,065 B2 | 8/2015 | Baba | |
| 9,366,920 B2 | 6/2016 | Kim et al. | |
| 2016/0011443 A1* | 1/2016 | Jeon | G02F 1/133634 349/43 |
| 2017/0192265 A1 | 7/2017 | Ha et al. | |

FOREIGN PATENT DOCUMENTS

| | | | | |
|---|---|---|---|---|
| KR | 10-1715852 | | 3/2017 | |
| KR | 10-2017-0064171 | | 6/2017 | |
| WO | WO 2016/148431 | * | 9/2016 | ........... G02F 1/1334 |

* cited by examiner

FIG. 8

| Data Voltage(VD) | Gray Scale(Gy) |
|---|---|
| VD=V1 | First Gray Scale(Gy1) |
| Vth < VD < VR | First Gray Scale(Gy1) |
| VR < VD < VH | Second Gray Scale(Gy2) |
| VH < VD | Second Gray Scale(Gy2) |

DISPLAY PANEL AND DISPLAY DEVICE INCLUDING THE SAME

CROSS-REFERENCE TO RELATED APPLICATION

This application claims priority to and the benefit of Korean Patent Application No. 10-2017-0131660, filed on Oct. 11, 2017, the content of which in its entirety is herein incorporated by reference.

BACKGROUND

1. Field

Embodiments of the invention relate to a display device and, more particularly, to a display panel including two liquid crystal layers and a display device including the display panel.

2. Description of the Related Art

Recently, thin, light and low-power flat panel display devices have been rapidly developed along with the information technology industry. These flat panel display devices have replaced conventional cathode ray tubes (CRTs). The flat panel display devices may include liquid crystal display (LCD) devices, plasma display panel (PDP) devices, electroluminescence display (ELD) devices, and field emission display (FED) devices.

Among them, the liquid crystal display devices excellently display moving images and have high contrast ratios. Thus, the liquid crystal display devices are actively used in various fields such as notebook computers, monitors, and televisions.

The liquid crystal display device may include a liquid crystal display panel and a light source, and the liquid crystal display panel may display an image using light emitted from the light source. The liquid crystal display panel may include a liquid crystal layer of which a light transmittance is controlled based on an intensity of an electric field formed between a pixel electrode and a common electrode.

SUMMARY

Embodiments of the invention may provide a display panel capable of driving two liquid crystal layers by one pixel electrode and one common electrode, and a display device including the same.

In an aspect of the invention, a display device includes a display panel and a light source. The light source is configured to provide a light to the display panel. The display panel includes a first polarizing layer, the light being incident of the first polarizing layer, a first base layer disposed on the first polarizing layer, the first base layer including a pixel electrode and a common electrode, a first liquid crystal layer disposed on the first base layer and including a plurality of first nanocapsules, a second liquid crystal layer disposed on the first liquid crystal layer and including a plurality of second nanocapsules, a second polarizing layer disposed between the first liquid crystal layer and the second liquid crystal layer, a second base layer disposed on the second liquid crystal layer, and a third polarizing layer disposed on the second base layer. Each of the first and second liquid crystal layers controls a transmittance of the light based on an intensity of an electric field between the pixel electrode and the common electrode.

In some embodiments, the first and third polarizing layers may have a first polarization axis parallel to a first direction, and the second polarizing layer may have a second polarization axis parallel to a second direction perpendicular to the first direction.

In some embodiments, the display panel may display a black gray scale when the intensity of the electric field is less than a reference electric field intensity.

In some embodiments, the light transmitted through the first polarizing layer may be blocked by the second polarizing layer when the intensity of the electric field is less than a threshold electric field intensity.

In some embodiments, when the intensity of the electric field is less than the reference electric field intensity, the first nanocapsules may rotate a polarization direction of the light transmitted through the first polarizing layer to allow the rotated polarization direction to be parallel to the second polarization axis, and the light transmitted through the second polarizing layer may be blocked by the third polarizing layer.

In some embodiments, the display panel may display a color gray scale higher than a black gray scale when the intensity of the electric field is greater than a reference electric field intensity.

In some embodiments, when the intensity of the electric field is greater than the reference electric field intensity, the first nanocapsules may rotate a first polarization direction of the light transmitted through the first polarizing layer to allow the rotated first polarization direction to be parallel to the second polarization axis, and only some of the second nanocapsules may rotate a second polarization direction of the light transmitted through the second polarizing layer to allow the rotated second polarization direction to be parallel to the first polarization axis.

In some embodiments, when the intensity of the electric field is greater than the reference electric field intensity, the first nanocapsules may rotate a first polarization direction of the light transmitted through the first polarizing layer to allow the rotated first polarization direction to be parallel to the second polarization axis, and the second nanocapsules may rotate a second polarization direction of the light transmitted through the second polarizing layer to allow the rotated second polarization direction to be parallel to the first polarization axis.

In some embodiments, each of the first nanocapsules may include a plurality of first liquid crystal molecules and each of the second nanocapsules may include a plurality of second liquid crystal molecules. The first and second liquid crystal molecules may rotate a polarization direction of the light, depending on the intensity of the electric field.

In some embodiments, a positive dielectric anisotropy of the second nanocapsules may be greater than a positive dielectric anisotropy of the first nanocapsules.

In some embodiments, a refractive index of the second nanocapsules may be greater than a refractive index of the first nanocapsules.

In some embodiments, the pixel electrode and the common electrode may be disposed on different layers from each other.

In some embodiments, the pixel electrode and the common electrode may be disposed on the same layer.

In some embodiments, the light provided from the light source may have a first color, and the second base layer may include a conversion part absorbing the light of the first color to emit light of a color different from the first color.

In some embodiments, the conversion part may include a first conversion part including a first illuminant emitting light of a second color different from the first color, a second conversion part including a second illuminant emitting light of a third color different from the second color, and a third conversion part transmitting the light of the first color.

In some embodiments, the first liquid crystal layer may further include an organic layer in which the first nanocapsules are dispersed, and the first liquid crystal layer may be provided in a film type.

In some embodiments, the second liquid crystal layer may further include an organic layer in which the second nanocapsules are dispersed, and the second liquid crystal layer may be provided in a film type.

In some embodiments, a sum of thicknesses of the first to third polarizing layers may be equal to or less than 10 μm.

In another aspect of the invention, a display panel includes a first base layer including a pixel electrode and a common electrode, a first liquid crystal film disposed on the first base layer and including a plurality of first nanocapsules and a first buffer layer in which the first nanocapsules are dispersed, a second liquid crystal film disposed on the first liquid crystal film and including a plurality of second nanocapsules and a second buffer layer in which the second nanocapsules are dispersed, and a polarizing layer disposed between the first liquid crystal film and the second liquid crystal film.

In some embodiments, a thickness of the polarizing layer may be equal to or less than 3 μm.

BRIEF DESCRIPTION OF THE DRAWINGS

The above and other aspects and features of the present invention will become more apparent by describing in further detail exemplary embodiments thereof with reference to the accompanying drawings, in which:

FIG. 8 is a table illustrating a gray scale represented from a display device depending on a data voltage provided to a pixel electrode, according to some embodiments of the invention;

DETAILED DESCRIPTION

Figure 1:
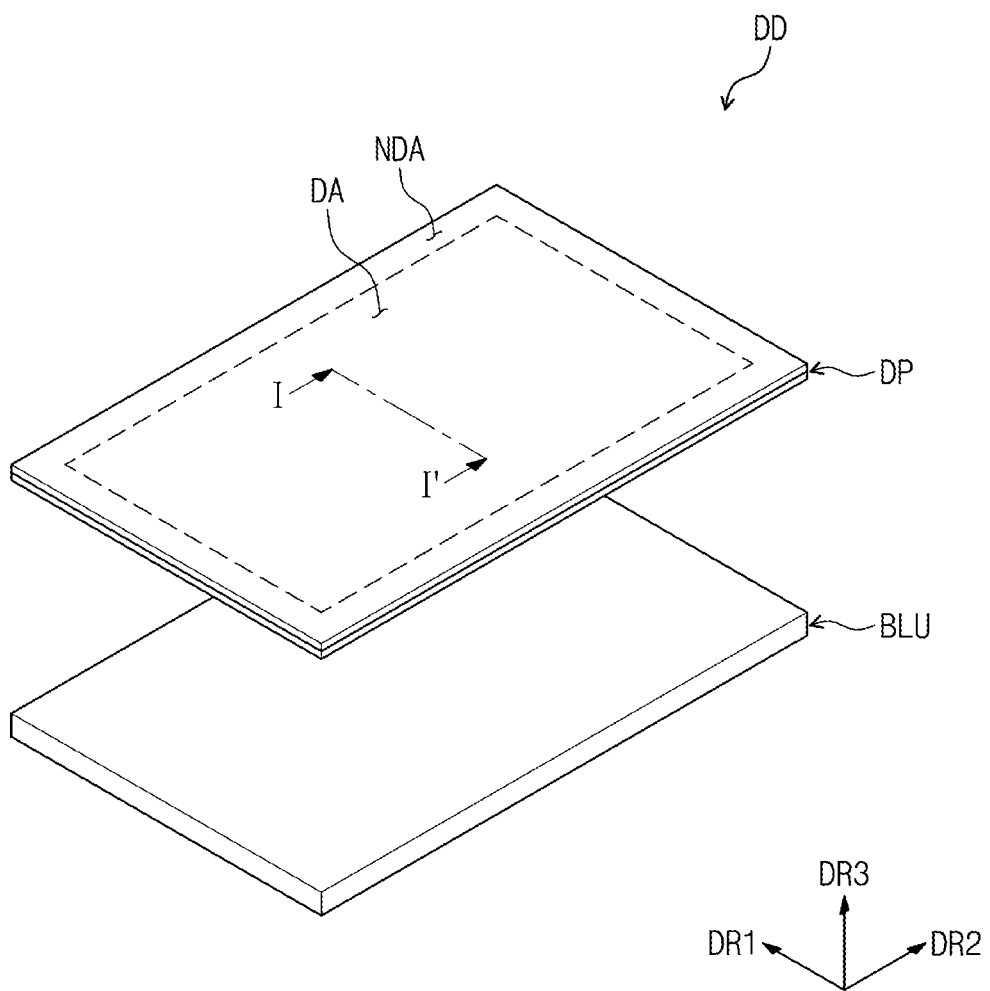
FIG. 1 is an exploded perspective view illustrating a display device according to an embodiment of the invention.

The invention now will be described more fully hereinafter with reference to the accompanying drawings, in which various embodiments are shown. This invention may, however, be embodied in many different forms, and should not be construed as limited to the embodiments set forth herein. Rather, these embodiments are provided so that this disclosure will be thorough and complete, and will fully convey the scope of the invention to those skilled in the art. Like reference numerals refer to like elements throughout.

It will be understood that when an element such as a layer, region or substrate is referred to as being "on" another element, it can be directly on the other element or intervening elements may be present. In contrast, the term "directly" means that there are no intervening elements. As used herein, the term "and/or" includes any and all combinations of one or more of the associated listed items. The terminology used herein is for the purpose of describing particular embodiments only and is not intended to be limiting. As used herein, the singular forms "a," "an," and "the" are intended to include the plural forms, including "at least one," unless the content clearly indicates otherwise. "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Spatially relative terms, such as "beneath", "below", "lower", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly. It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings herein.

Exemplary embodiments are described herein with reference to cross-sectional illustrations and/or plane illustrations that are idealized exemplary illustrations. In the drawings, the thicknesses of layers and regions may be exaggerated for clarity. Accordingly, variations from the shapes of the illustrations as a result, for example, of manufacturing techniques and/or tolerances, are to be expected. Thus, exemplary embodiments should not be construed as limited to the shapes of regions illustrated herein but are to include deviations in shapes that result, for example, from manufacturing. For example, an etching region illustrated as a rectangle will, typically, have rounded or curved features. Thus, the regions illustrated in the figures are schematic in nature and their shapes are not intended to illustrate the actual shape of a region of a device and are not intended to limit the scope of exemplary embodiments.

Figure 2:
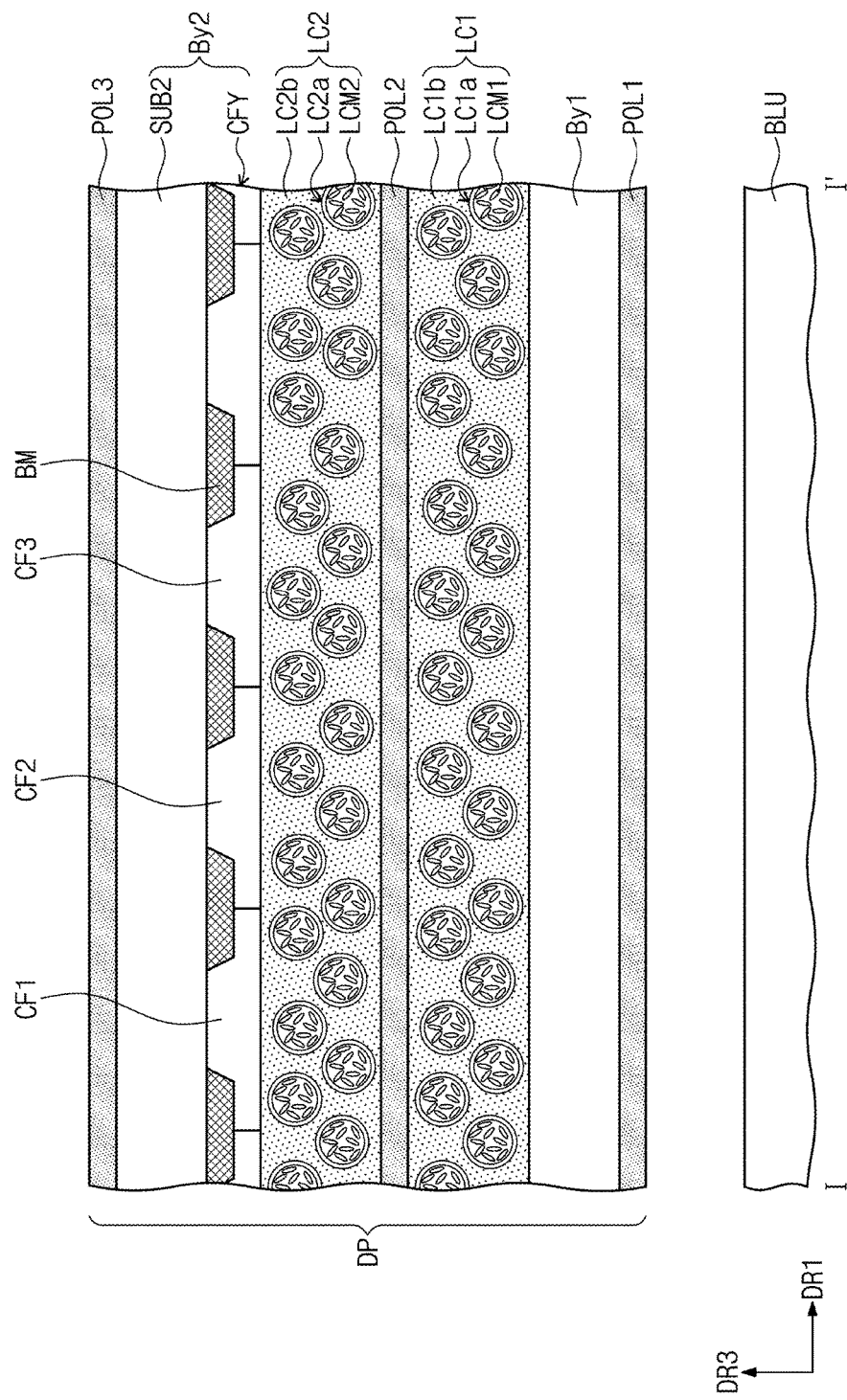
FIG. 2 is a cross-sectional view taken along a line I-I' of FIG. 1.
Figure 3:
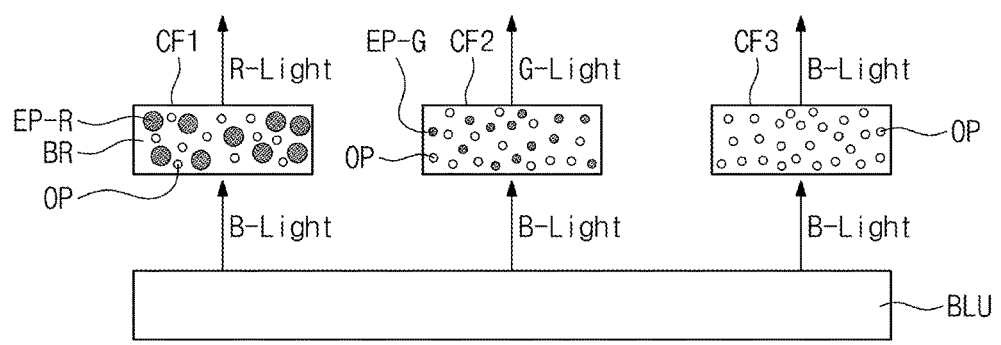
FIG. 3 is a schematic view illustrating light characteristics of conversion parts according to an embodiment of the invention.

FIG. 1 is an exploded perspective view illustrating a display device according to an embodiment of the invention. FIG. 2 is a cross-sectional view taken along a line I-I' of FIG. 1. FIG. 3 is a schematic view illustrating light characteristics of conversion parts according to an embodiment of the invention.

According to embodiments of the invention, a display device DD illustrated in FIG. 1 may be applied to a tablet personal computer, a smart phone, a personal digital assistant (PDA), a portable multimedia player (PMP), a game console, and/or a watch-type electronic device. In addition, the display device DD may also be applied to large-sized electronic devices (e.g., a large television and/or an external billboard) and small and middle-sized electronic devices (e.g., a personal computer, a notebook computer, a car navigation unit, and/or a camera).

Referring to FIG. 1, the display device DD may include a display panel DP and a light source BLU. The display panel DP may provide an image, and the light source BLU may generate light to be provided to the display panel DP.

The display panel DP may include a display area DA displaying an image and a non-display area NDA not displaying an image. The non-display area NDA may be disposed adjacent to the display area DA. In an embodiment, the non-display area NDA may surround the display area DA.

According to some embodiments of the invention, the display panel DP may be a liquid crystal display panel, a plasma display panel, an electrophoretic display panel, a microelectromechanical system (MEMS) display panel, or an electrowetting display panel.

Hereinafter, the display panel DP will be described as being a liquid crystal display panel. The display panel DP may be a twisted nematic liquid crystal display panel, a horizontal alignment type liquid crystal display panel, or a vertical alignment type liquid crystal display panel. The display panel DP may be provided as the horizontal alignment type liquid crystal display panel.

The display panel DP is parallel to a plane defined by a first direction DR1 and a second direction DR2 (e.g., the display area DA of the display panel DP is parallel to the plane defined by the first direction DR1 and the second direction DR2). A normal direction of the display panel DP is indicated by a third direction DR3. The third direction DR3 indicates a thickness direction of the display panel DP. A top surface (or a front surface) and a bottom surface (or a back surface) of each member are defined by the third direction DR3. However, the directions DR1, DR2, and DR3 may be relative concepts and may be changed into other directions.

The display device DD of FIG. 1 is illustrated as having a flat shape. However, embodiments of the invention are not limited thereto. In an embodiment, the display device DD may be a curved display device. For example, the display device DD may be a curved display device which is wholly concavely or convexly curved when a user views the display device. Alternatively, the display device DD may be a display device of which only a portion is bent (e.g., curved).

In an embodiment, the display device DD may be a flexible display device. For example, the display device DD may be a foldable display device or a rollable display device.

In an embodiment, the display area DA of the display panel DP may include a plurality of pixel areas (not shown). The pixel areas may be defined by, for example, a plurality of gate lines and a plurality of data lines. The pixel areas may be arranged in a matrix form. A pixel may be disposed in each of the pixel areas. An exemplary pixel will be described later in detail with reference to FIGS. 4 and 5.

Referring to FIG. 2, a cross-sectional view of the display panel DP overlapping with the display area DA is illustrated according to embodiments of the present disclosure.

The display panel DP may include a first base layer By1, a first polarizing layer POL1, a first liquid crystal layer LC1, a second polarizing layer POL2, a second liquid crystal layer LC2, a third polarizing layer POL3, and a second base layer By2.

The first polarizing layer POL1 receives light from the light source BLU. The first polarizing layer POL1 may have a first polarization axis parallel to one direction (e.g., parallel to the first direction DR1). The first polarizing layer POL1 may be a polarizing layer formed by a coating method or a polarizing layer formed by a deposition method. For example, the first polarizing layer POL1 may be formed by performing the coating method using a material including a dichroic dye and a liquid crystal compound.

The first base layer By1 may be disposed on the first polarizing layer POL1 in the third direction DR3. The first polarizing layer POL1 is disposed under the first base layer By1 in the present embodiment. However, embodiments of the invention are not limited thereto. In another embodiment, the first polarizing layer POL1 may not be included in the display panel DP but may be included in the light source BLU (e.g., on the light source BLU).

The first base layer By1 may support the display panel DP (e.g., entirely support the display panel DP). Even though not shown in FIG. 2, the first base layer By1 may include a first substrate, and a plurality of thin film transistors, a pixel electrode and a common electrode which are disposed on the first substrate. This will be described later in more detail with reference to FIG. 7.

The first liquid crystal layer LC1 may be disposed on the first base layer By1 in the third direction DR3. The first liquid crystal layer LC1 may include a plurality of first nanocapsules LC1a and a first buffer layer LC1b in which the first nanocapsules LC1a are dispersed. The first buffer layer LC1b may be an organic layer.

According to an embodiment, the first liquid crystal layer LC1 may be provided in the form of a film or a sheet. Because the first liquid crystal layer LC1 according to the invention is provided in the form of the film, the first liquid crystal layer LC1 may not require two substrates for defining a space filled with the first liquid crystal layer LC1 but may be disposed on one substrate.

In an embodiment, each of the first nanocapsules LC1a may include a plurality of first liquid crystal molecules LCM1 and an outer wall surrounding the first liquid crystal molecules LCM1. The first liquid crystal molecules LCM1 may be randomly arranged in each of the first nanocapsules LC1a.

In particular, because the first nanocapsules LC1a are prevented from being distorted or deformed by an external pressure or impact, the first nanocapsules LC1a may be effectively applied to a flexible display device. In addition, the first nanocapsules LC1a may have optical isotropy when an electric field is not applied thereto, but the first nanocapsules LC1a may be aligned in a direction of the electric field to double-refract incident light when the electric field is applied thereto. Thus, the first nanocapsules LC1a may form an optical axis based on the applied electric field and may transmit light by controlling optical characteristics.

For example, the first polarizing layer POL1 may transmit light vibrating in a direction parallel to the first polarization axis. In this case, the first nanocapsules LC1a may transmit light incident through the first polarizing layer POL1 without changing the light when the electric field is not formed between the pixel electrode and the common electrode. In other words, the first nanocapsules LC1a may transmit the light polarized along the first polarization axis without changing the light when the electric field is not formed between the pixel electrode and the common electrode.

When the electric field is formed between the pixel electrode and the common electrode, the first nanocapsules LC1a may rotate a polarization direction (i.e., parallel to the first polarization axis) of the light incident from the first polarizing layer POL1 by 90 degrees.

The second polarizing layer POL2 may be disposed on the first liquid crystal layer LC1 in the third direction DR3. The second polarizing layer POL2 may have a second polarization axis parallel to another direction crossing (e.g., perpendicular to) the one direction of the first polarization axis (e.g., the second polarization axis may be perpendicular to the first polarization axis). The second polarizing layer POL2 may be a polarizing layer formed by a coating method or a polarizing layer formed by a deposition method. For example, the second polarizing layer POL2 may be formed by performing the coating method using a material including a dichroic dye and a liquid crystal compound.

As described above, the first nanocapsules LC1a may transmit the light polarized along the first polarization axis without changing the light when the electric field is not formed between the pixel electrode and the common electrode. In this case, the second polarizing layer POL2 may block the light which is polarized along the first polarization axis and is provided through the first nanocapsules LC1a. In other words, light polarized along the second polarization axis may pass through the second polarizing layer POL2, but the light polarized along the first polarization axis may not pass through the second polarizing layer POL2. Thus, the display panel DP may display a black gray scale.

On the other hand, when the electric field is formed between the pixel electrode and the common electrode, the first nanocapsules LC1a may rotate the polarization direction of the light incident from the first polarizing layer POL1 (i.e., parallel to the first polarization axis) by 90 degrees. The light polarized along the first polarization axis through the first polarizing layer POL1 may be converted into light which has a polarization direction parallel to the second polarization axis rotated from the first polarization axis by 90 degrees by the first nanocapsules LC1a. As a result, the light incident from the first polarizing layer POL1 may pass through the second polarizing layer POL2. Thus, the display panel DP may display a white gray scale.

The second liquid crystal layer LC2 may be disposed on the second polarizing layer POL2 in the third direction DR3. The second liquid crystal layer LC2 may include a plurality of second nanocapsules LC2a and a second buffer layer LC2b in which the second nanocapsules LC2a are dispersed. For example, the second buffer layer LC2b may be an organic layer.

According to an embodiment, the second liquid crystal layer LC2 may be provided in the form of a film or a sheet. Because the second liquid crystal layer LC2 according to the invention is provided in the form of the film, the second liquid crystal layer LC2 may not require two substrates for defining a space filled with the second liquid crystal layer LC2 but may be disposed on one substrate.

Each of the first and second liquid crystal layers LC1 and LC2 according to some embodiments of the present disclosure may not have a structure disposed and sealed between two substrates but may have a structure disposed on one substrate. Thus, a total thickness of the display device can be reduced.

Each of the second nanocapsules LC2a may include a plurality of second liquid crystal molecules LCM2 and an outer wall surrounding the second liquid crystal molecules LCM2. The second liquid crystal molecules LCM2 may be randomly arranged in each of the second nanocapsules LC2a.

Because the second nanocapsules LC2a are prevented from being distorted or deformed by an external pressure or impact, the second nanocapsules LC2a may be effectively applied to a flexible display device. In addition, the second nanocapsules LC2a may have optical isotropy when an electric field is not applied thereto, but the second nanocapsules LC2a may be aligned in a direction of the electric field to double-refract incident light when the electric field is applied thereto. Thus, the second nanocapsules LC2a may form an optical axis based on the applied electric field and may transmit light by controlling optical characteristics.

For example, the second polarizing layer POL2 may transmit light vibrating in a direction parallel to the second polarization axis. In this case, the second nanocapsules LC2a may transmit the light incident through the second polarizing layer POL2 without changing the light when an electric field having an intensity equal to or greater than a reference electric field intensity is not formed between the pixel electrode and the common electrode. Here, the reference electric field intensity means an intensity of an electric field that is applied to the second nanocapsules LC2a of the second liquid crystal layer LC2 by the pixel and common electrodes to rotate a polarization direction of the light incident into the second nanocapsules LC2a (e.g., an intensity of an electric field at which nanocapsules LC2a rotate the polarization direction of light passing through them). In other words, the second nanocapsules LC2a may transmit the light polarized along the second polarization axis without changing the light when an electric field is not formed between the pixel electrode and the common electrode. The light polarized along the second polarization axis may pass through the second polarizing layer POL2 but may not pass through the third polarizing layer POL3 having the first polarization axis.

Even though a portion of the light polarized along the first polarization axis is scattered by the first nanocapsules LC1a to pass through the second polarizing layer POL2, the scattered light may be blocked by the second liquid crystal layer LC2 and the third polarizing layer POL3, as described above. As a result, the display panel DP may more clearly display the black gray scale.

On the other hand, when the electric field having the intensity equal to or greater than the reference electric field intensity is formed between the pixel electrode and the common electrode, the second nanocapsules LC2a may rotate a polarization direction of the light incident from the second polarizing layer POL2 (i.e., parallel to the second polarization axis) by 90 degrees. The light polarized along the second polarization axis through the second polarizing layer POL2 may be converted into light which has a polarization direction parallel to the first polarization axis rotated from the second polarization axis by 90 degrees by the second nanocapsules LC2a. In this case, the light incident from the second polarizing layer POL2 may pass through the third polarizing layer POL3. Thus, the display panel DP may display a white gray scale.

Here, the second liquid crystal layer LC2 may rotate the polarization direction of the light when the intensity of the electric field between the pixel electrode and the common electrode is equal to or greater than the reference electric field intensity. This may be because the influence of the electric field between the pixel and common electrodes upon the second liquid crystal layer LC2 may be less than the influence of the electric field upon the first liquid crystal layer LC1 because a distance from the pixel and common electrodes to the second liquid crystal layer LC2 in the third direction DR3 is greater than a distance from the pixel and common electrodes to the first liquid crystal layer LC1 in the third direction DR3.

According to an embodiment of the invention, the first nanocapsules LC1a of the first liquid crystal layer LC1 and the second nanocapsules LC2a of the second liquid crystal layer LC2 may have positive dielectric anisotropies. In this case, the dielectric anisotropy of the second nanocapsules LC2a may be greater than the dielectric anisotropy of the first nanocapsules LC1a. A light transmittance may increase as a dielectric anisotropy of a liquid crystal layer increases when an electric field of the same intensity is applied to the liquid crystal layer.

According to an embodiment of the invention, a refractive index of the second nanocapsules LC2a may be greater than a refractive index of the first nanocapsules LC1a. A light transmittance may increase as a refractive index of a liquid crystal layer increases when an electric field of the same intensity is applied to the liquid crystal layer.

The second base layer By2 may be disposed on the second liquid crystal layer LC2. The second base layer By2 may include a color conversion layer CFY and a second substrate SUB2. The second substrate SUB2 may be a polymer substrate, a plastic substrate, a glass substrate, or a quartz substrate. The second substrate SUB2 may be a transparent insulating substrate. The second substrate SUB2 may be rigid or flexible.

The color conversion layer CFY may be disposed between the second substrate SUB2 and the second liquid crystal layer LC2. The color conversion layer CFY may include a plurality of conversion parts CF1, CF2 and CF3. In an embodiment, the conversion parts CF1, CF2 and CF3 may be provided as first to third color filters for outputting red light, green light and blue light, respectively.

In an embodiment, the color conversion layer CFY may include an illuminant that absorbs first color light provided from the light source BLU to emit light of a color different from the first color. In this case, the light source BLU may output blue light as the first color light.

In more detail, referring to FIG. 3, the color conversion layer CFY may include a first conversion part CF1 including a first illuminant EP-R, a second conversion part CF2 including a second illuminant EP-G, and a third conversion part CF3 transmitting the first color light.

For example, the first illuminant EP-R may absorb the first color light (e.g., the blue light B-Light) and may emit red light R-Light. The second illuminant EP-G may absorb the first color light (e.g., the blue light B-Light) and may emit green light G-Light. Hereinafter, the red light is referred to as 'second color light', and the green light is referred to as 'third color light'. In other words, the first conversion part CF1 may be a light emitting area emitting the red light, and the second conversion part CF2 may be a light emitting area emitting the green light.

The third conversion part CF3 may not include an illuminant. The third conversion part CF3 may transmit the first color light provided from the light source BLU. In other words, the third conversion part CF3 may be a light emitting area emitting the blue light.

Each of the first to third conversion parts CF1, CF2 and CF3 may include a base resin BR. The base resin BR may be a polymer resin. For example, the base resin BR may be an acrylic-based resin, a urethane-based resin, a silicon-based resin, or an epoxy-based resin. The base resin BR may be a transparent resin.

In addition, the first to third conversion parts CF1, CF2 and CF3 may further include scattering particles OP. The scattering particles OP may be $TiO_2$ or silica-based nano-particles. The scattering particles OP may scatter the light emitted from the illuminant to output the light to the outside of the conversion part. In the third conversion part CF3 transmitting the provided light without changing the provided light, the scattering particles OP may scatter the provided light to output the provided light to the outside.

The first and second illuminants EP-R and EP-G included in the color conversion layer CFY may be fluorescent substances or quantum dots. In other words, in an embodiment, the color conversion layer CFY may include at least one of fluorescent substances or quantum dots as the illuminants EP-R and EP-G.

For example, the fluorescent substances used as the illuminants EP-R and EP-G may be inorganic fluorescent substances. In the display device DD according to an embodiment, the fluorescent substances used as the illuminants EP-R and EP-G may be a red fluorescent substance and a green fluorescent substance.

The quantum dot may have a core-shell structure including a core and a shell surrounding the core. Alternatively, the conversion part may have a core-shell structure in which one quantum dot surrounds another quantum dot. An interface of the core and the shell may have a concentration gradient in which a concentration of an element existing in the shell becomes progressively less toward a center.

The quantum dot may be a nano-sized particle. The quantum dot may have an emission wavelength spectrum with a full width at half maximum (FWHM) of about 45 nm or less (in particular, about 40 nm or less, and more particularly, about 30 nm or less), and color purity and/or color reproduction can be improved in the range. In addition, light emitted through the quantum dot may be emitted in all directions, and thus a wide viewing angle can be improved or realized.

Furthermore, a shape of the quantum dot may be a general shape known in the art but is not limited to a specific shape. For example, the quantum dot may have a spherical shape, a pyramidal shape, a multi-arm shape, a cubic nanoparticle shape, a nanotube shape, a nanowire shape, a nanofiber shape, or a nano-plate particle shape.

According to an embodiment of the invention, a color of light emitted from the quantum dot may be changed depending on a particle size of the quantum dot. When the first illuminant EP-R and the second illuminant EP-G are the quantum dots, a particle size of the first illuminant EP-R may be different from a particle size of the second illuminant EP-G. For example, the particle size of the first illuminant EP-R may be greater than the particle size of the second illuminant EP-G. In this case, a wavelength of light emitted from the first illuminant EP-R may be longer than a wavelength of light emitted from the second illuminant EP-G.

Referring again to FIG. 2, a light shielding part BM may be disposed between the conversion parts CF1, CF2 and CF3. The light shielding part BM may be a black matrix and may be included in the color conversion layer CFY. The light shielding part BM may include an organic light shielding material or inorganic light shielding material which includes a black pigment or dye. The light shielding part BM may prevent a leakage phenomenon of light and may form a boundary between the conversion parts adjacent to each other.

The third polarizing layer POL3 may be disposed on the second base layer By2. In the present embodiment, the third polarizing layer POL3 is disposed on the second base layer By2. However, embodiments of the invention are not limited thereto. In another embodiment, the third polarizing layer POL3 may be disposed between the second liquid crystal layer LC2 and the second base layer By2.

The third polarizing layer POL3 may have the first polarization axis parallel to the one direction of the first polarization axis of the first polarizing layer POL1 . The third polarizing layer POL3 may be a polarizing layer formed by a coating method or a polarizing layer formed by a deposition method. For example, the third polarizing layer POL3 may be formed by performing the coating method using a material including a dichroic dye and a liquid crystal compound.

As described above, when the electric field having the intensity equal to or greater than the reference electric field intensity is not formed between the pixel electrode and the common electrode, the second nanocapsules LC2a may transmit the light polarized along the second polarization axis without changing the light. In this case, the third polarizing layer POL3 may block the light which is polarized along the second polarization axis and is provided through the second nanocapsules LC2a. In other words, the light polarized along the first polarization axis may pass through the third polarizing layer POL3, but the light polarized along the second polarization axis may not pass through the third polarizing layer POL3. Thus, the display panel DP may display a black gray scale.

On the other hand, when the electric field having the intensity equal to or greater than the reference electric field intensity is formed between the pixel electrode and the common electrode, the second nanocapsules LC2a may rotate the polarization direction (i.e., parallel to the second polarization axis) of the light incident from the second polarizing layer POL2 by 90 degrees. The light polarized along the second polarization axis through the second polarizing layer POL2 may be converted into the light, which has the polarization direction parallel to the first polarization axis rotated from the second polarization axis by 90 degrees, by the second nanocapsules LC2a. As a result, the light incident from the second polarizing layer POL2 may pass through the third polarizing layer POL3. Thus, the display panel DP may display a white gray scale.

Meanwhile, each of the first to third polarizing layers POL1 to POL3 may have a thickness of 3 μm or less. In other words, a sum of the thicknesses of the first to third polarizing layers POL1 to POL3 may be equal to or less than 10 μm. The value of the thickness of each of the polarizing layers may be a value capable of effectively transmitting the intensity of the electric field between the pixel and common electrodes to the second liquid crystal layer LC2.

Figure 4:
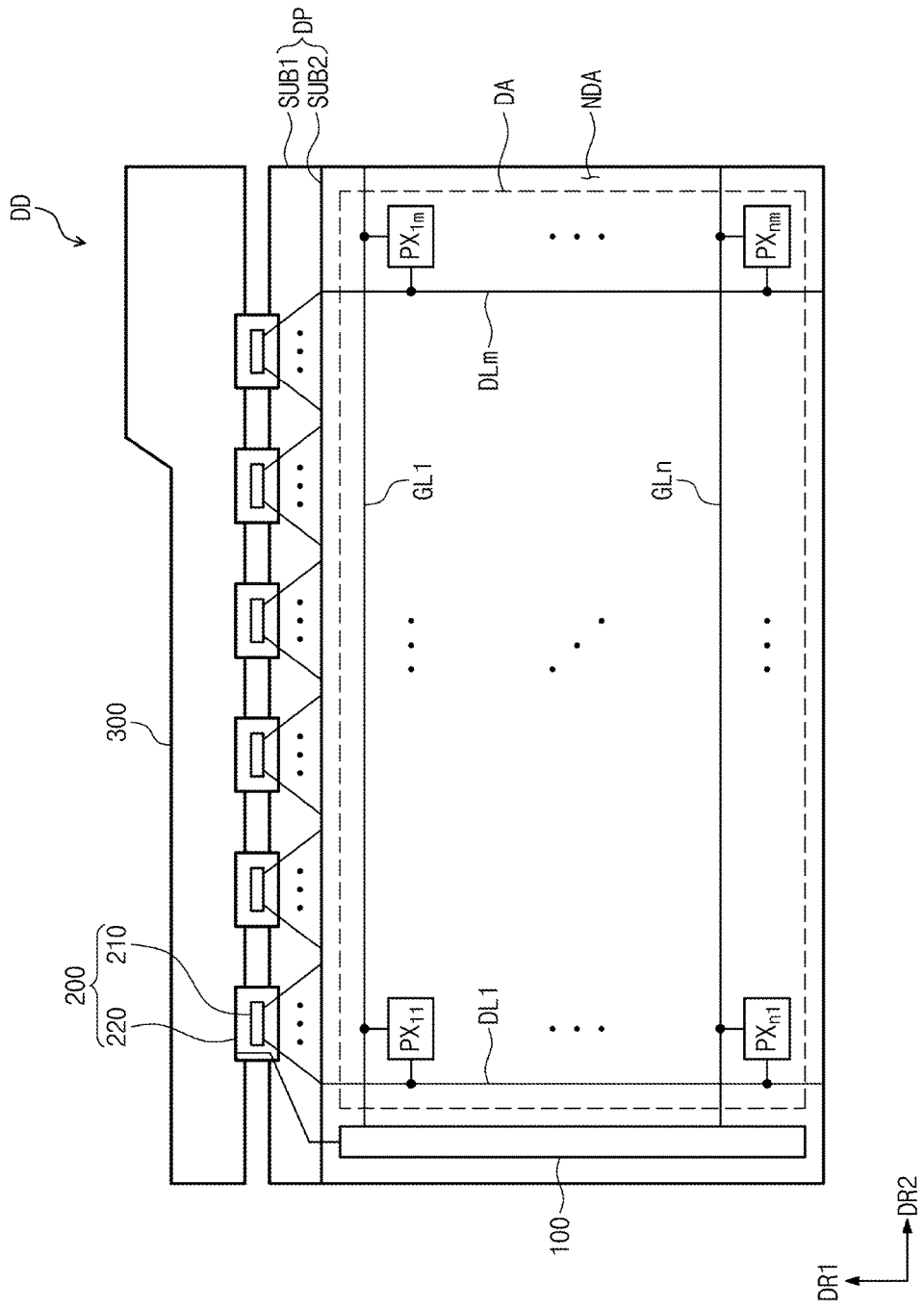
FIG. 4 is a plan view illustrating a display device according to an embodiment of the invention.
Figure 5:
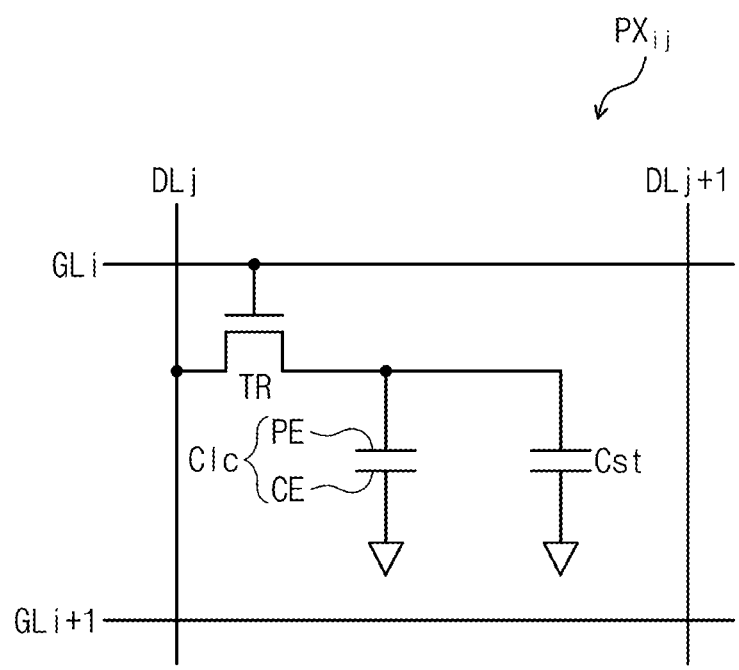
FIG. 5 is an equivalent circuit diagram of a pixel of FIG. 4 according to an embodiment of the invention.

FIG. 4 is a plan view illustrating a display device according to an embodiment of the invention. FIG. 5 is an equivalent circuit diagram of a pixel of FIG. 4 according to an embodiment of the invention.

Referring to FIG. 4, a display device DD may include a gate driving circuit 100, a data driving circuit 200, a circuit substrate 300, and a display panel DR The display panel DP may include a display area DA in which a plurality of pixels $PX_{11}$ to $PX_{nm}$ is disposed, and a non-display area NDA surrounding the display area DA.

A plurality of gate lines GL1 to GLn and a plurality of data lines DL1 to DLm crossing the gate lines GL1 to GLn may be disposed on a first substrate SUB1 of the display panel DP. Some of the plurality of the gate lines GL1 to GLn and some of the plurality of the data lines DL1 to DLm are illustrated in FIG. 4 for the purpose of ease and convenience in illustration.

The plurality of gate lines GL1 to GLn may be connected to the gate driving circuit 100 and may sequentially receive gate signals from the gate driving circuit 100. The plurality of data lines DL1 to DLm may be connected to the data driving circuit 200 and may receive data signals (or data voltages) (e.g., analog data signals) from the data driving circuit 100.

Each of the pixels $PX_{11}$ to $PX_{nm}$ may be connected to a corresponding one of the plurality of gate lines GL1 to GLn and a corresponding one of the plurality of data lines DL1 to DLm.

The gate driving circuit 100 may be formed simultaneously with the pixels $PX_{11}$ to $PX_{nm}$ by thin film processes. For example, the gate driving circuit 100 may be formed in the non-display area NDA in the form of an amorphous silicon TFT gate driver circuit (ASG). However, embodiments of the invention are not limited thereto. In another embodiment, the gate driving circuit 100 may be connected to the display panel DP in the form of a tape carrier package (TCP). In other words, the gate driving circuit 100 may be electrically connected to the display panel DP through a plurality of flexible circuit substrates.

In FIG. 4, the gate driving circuit 100 is connected to left ends of the gate lines GL1 to GLn. However, embodiments of the invention are not limited thereto. In another embodiment, a display device may include two gate driving circuits. One of the two gate driving circuits may be connected to left ends of the gate lines GL1 to GLn, and the other of the two gate driving circuits may be connected to right ends of the gate lines GL1 to GLn. In addition, one of the two gate driving circuits may be connected to odd-numbered gate lines, and the other thereof may be connected to even-numbered gate lines.

The data driving circuit 200 may receive data signals from a timing controller (not shown) mounted on the circuit substrate 300 and may generate analog data signals corresponding to the data signals.

The data driving circuit 200 may include a driving chip 210 and a flexible circuit substrate 220 on which the driving chip 210 is mounted. Each of the driving chip 210 and the flexible circuit substrate 220 may be provided in plurality. The flexible circuit substrate 220 may electrically connect the circuit substrate 300 and the first substrate SUB1 to each other. Each of the driving chips 210 may provide some of the data signals to corresponding ones of the data lines DL1 to DLm.

The data driving circuit 200 formed in the form of a tape carrier package (TCP) is illustrated as an example in FIG. 4. Alternatively, the data driving circuit 200 may be mounted on the first substrate SUB1 by a chip-on-glass (COG) method.

Each of the pixels $PX_{11}$ to $PX_{nm}$ illustrated in FIG. 4 may have an equivalent circuit illustrated in FIG. 5.

As illustrated in FIG. 5, a pixel $PX_{ij}$ may include a thin film transistor TR, a liquid crystal capacitor Clc, and a storage capacitor Cst. The thin film transistor TR may be electrically connected to an $i^{th}$ gate line GLi and a $j^{th}$ data line DLj. The thin film transistor TR may output a data signal received from the $j^{th}$ data line DLj in response to a gate signal received from the $i^{th}$ gate line GLi.

The liquid crystal capacitor Clc may include a pixel electrode PE and a common electrode CE. The pixel electrode PE may be electrically connected to the thin film transistor TR and may receive a data voltage corresponding to the data signal outputted from the $j^{th}$ data line DLj. The common electrode CE may receive a common voltage. Arrangements of the first and second liquid crystal molecules LCM1 and LCM2 of the first and second liquid crystal layers LC1 and LC2 illustrated in FIG. 2 may be changed depending on the amount of charge stored in the liquid crystal capacitor Clc based on the data voltage received in the pixel electrode PE and the common voltage received in the common electrode CE (e.g., the orientation of the first and second liquid crystal modules LCM1 and LCM2 may change based on the difference between the data voltage on the pixel electrode PE and the common voltage on the common electrode CE).

The storage capacitor Cst may be connected in parallel to the liquid crystal capacitor Clc. The storage capacitor Cst may maintain the arrangements (e.g., the orientation) of the liquid crystal molecules during a certain period.

Figure 6:
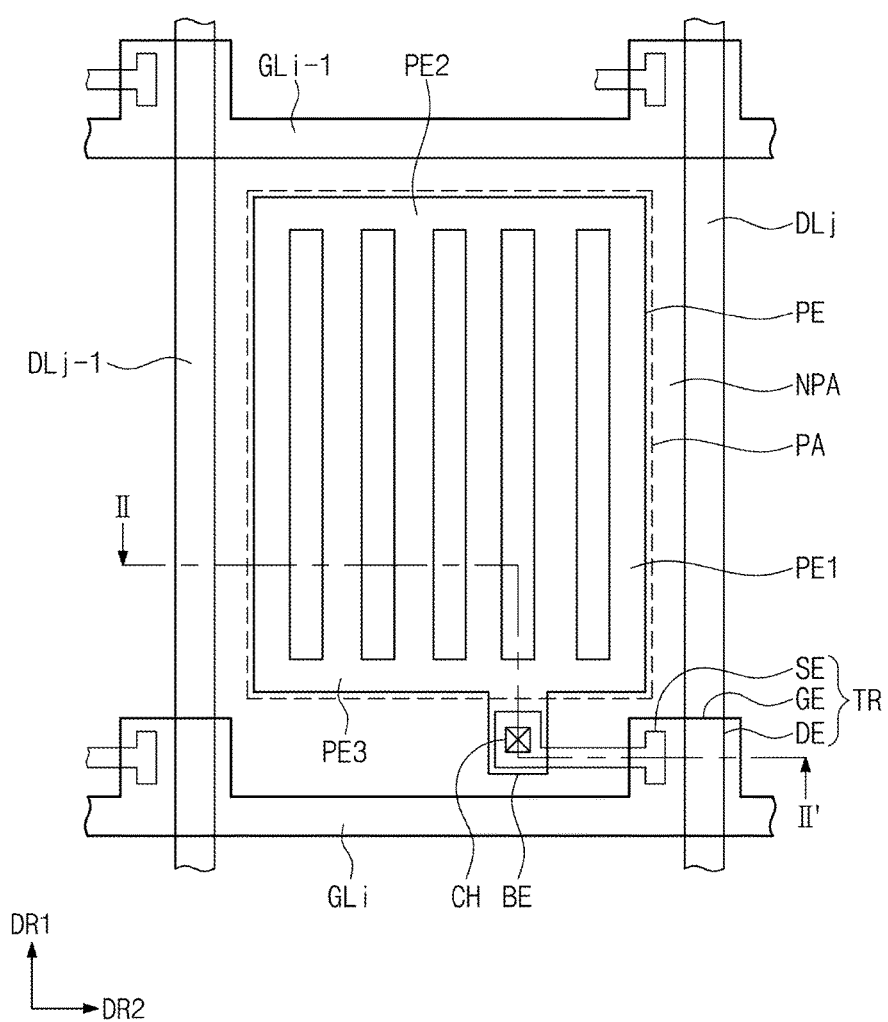
FIG. 6 is a plan view illustrating the pixel of FIG. 4 according to an embodiment of the invention.
Figure 7:
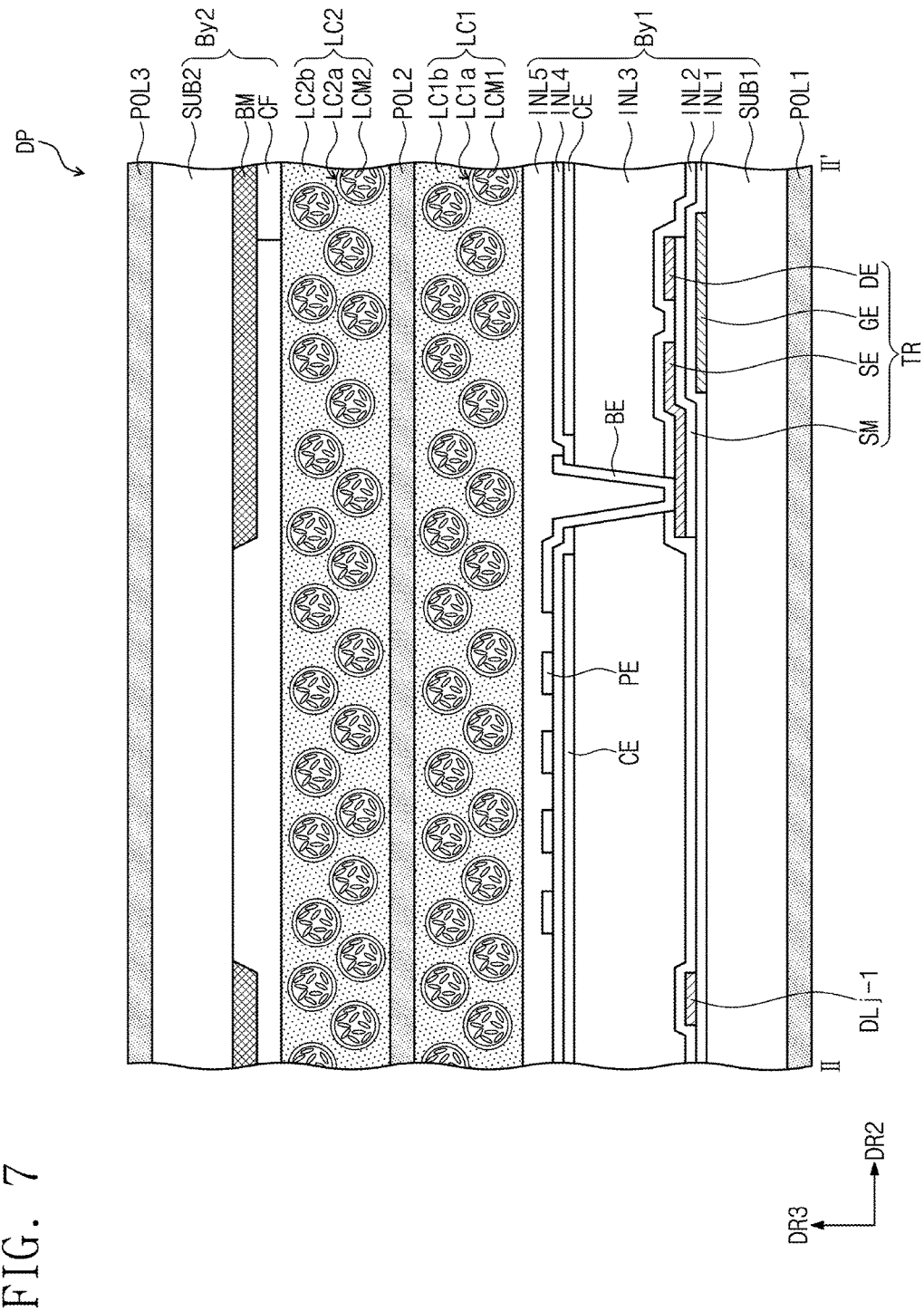
FIG. 7 is a cross-sectional view taken along a line II-II' of FIG. 6.

FIG. 6 is a plan view illustrating the pixel of FIG. 4 according to an embodiment of the invention. FIG. 7 is a cross-sectional view taken along a line II-II' of FIG. 6.

One pixel $PX_{ij}$ is illustrated in FIG. 6. However, other pixels of FIG. 4 may have the same structure as illustrated in FIG. 6. Hereinafter, a structure of the one pixel $PX_{ij}$ will be described for the purpose of ease and convenience in description.

Referring to FIG. 6, a planar area of the pixel $PX_{ij}$ may include a pixel area PA and a non-pixel area NPA around the pixel area PA. The pixel area PA may refer to an area in which an image is displayed, and the non-pixel area NPA may refer to an area in which an image is not displayed.

The non-pixel area NPA may refer to an area between the pixel areas PA. Thus, a planar area of the pixels $PX_{11}$ to $PX_{nm}$ may substantially include the pixel areas PA corresponding to the pixels $PX_{11}$ to $PX_{nm}$ and the non-pixel area NPA between the pixel areas PA.

Gate lines GLi-1 and GLi and data lines DLj-1 and DLj may be disposed in the non-pixel area NPA. The gate lines GLi-1 and GLi may extend in a second direction DR2. The data lines DLj-1 and DLj may extend in a first direction DR1 crossing the second direction DR2 to cross the gate lines GLi-1 and GLi and may be insulated from the gate lines GLi-1 and GLi. Here, 'i' is an integer greater than 0 and equal to or less than 'n'. In addition, 'j' is an integer greater than 0 and equal to or less than 'm'.

The pixel $PX_{ij}$ may include a thin film transistor TR and a pixel electrode PE connected to the thin film transistor TR. The thin film transistor TR may be disposed in the non-pixel area NPA. The pixel electrode PE may be disposed in the pixel area PA. The thin film transistor TR of the pixel $PX_{ij}$ may be connected to a corresponding gate line GLi and a corresponding data line DLj.

The thin film transistor TR may include a gate electrode GE connected to the gate line GLi, a drain electrode DE connected to the data line DLj, and a source electrode SE connected to the pixel electrode PE.

In more detail, the thin film transistor TR may include the gate electrode GE branched from the gate line GLi, the drain electrode DE referring to a portion of the data line DLj overlapping with the gate electrode GE, and the source electrode SE spaced apart from the drain electrode DE and overlapping the gate electrode GE. The source electrode SE may be electrically connected to the pixel electrode PE through a contact hole CH.

The pixel electrode PE may extend into the non-pixel area NPA so as to be connected to the source electrode SE of the thin film transistor TR through the contact hole CH. In more detail, a branch electrode BE branched from the pixel electrode PE may be connected to the source electrode SE of the thin film transistor TR through the contact hole CH. The branch electrode BE may be disposed in the non-pixel area NPA.

The pixel electrode PE may include a plurality of branch portions PE1, a first connection portion PE2, and a second connection portion PE3. The branch portions PE1 may extend in the first direction DR1 and may be arranged in the second direction DR2 at intervals (e.g., equal intervals or regular intervals). The first and second connection portions PE2 and PE3 may extend in the second direction DR2. The first connection portion PE2 may connect first ends of the branch portions PE1 to each other. The second connection portion PE3 may connect second ends of the branch portions PE1 to each other.

Though not shown in FIG. 6, the common electrode may be disposed in the pixel $PX_{ij}$.

Referring to FIG. 7, the first base layer By1 may include the first substrate SUB1, the thin film transistor TR, first to fifth insulating layers INL1, INL2, INL3, INL4 and INL5, the pixel electrode PE, and the common electrode CE.

The first polarizing layer POL1 may be disposed on a bottom surface of the first substrate SUB1. The first substrate SUB1 may be a polymer substrate, a plastic substrate, a glass substrate, or a quartz substrate. The first substrate SUB1 may be a transparent insulating substrate. The first substrate SUB1 may be rigid or flexible.

The thin film transistor TR of the pixel may be disposed on the first substrate SUB1. The thin film transistor TR may include the gate electrode GE, an active layer SM overlapping with the gate electrode GE, the drain electrode DE connected to the data line DLj (e.g., the drain electrode DE being a portion of the data line DLj), and the source electrode SE spaced apart from the drain electrode DE.

In more detail, the gate electrode GE may be disposed on the first substrate SUB1. The first insulating layer INL1 may cover the gate electrode GE and may be disposed on the first substrate SUB1.

The active layer SM, the drain electrode DE and the source electrode SE may be disposed on the first insulating layer INL1. The active layer SM may overlap with the gate electrode GE and may include a semiconductor layer and an ohmic contact layer. The drain electrode DE and the source electrode SE may be disposed on the active layer SM. Each of the drain electrode DE and the source electrode SE may overlap with at least a portion of the active layer SM. In addition, the data line DLj may be disposed on the first insulating layer INL1.

The second insulating layer INL2 may cover the thin film transistor TR and may be disposed on the first insulating layer INL1. The third insulating layer INL3 providing a planarization layer may be disposed on the second insulating layer INL2.

The common electrode CE may be disposed on the third insulating layer INL3. The fourth insulating layer INL4 may cover the common electrode CE and may be disposed on the third insulating layer INL3. The pixel electrode PE may be disposed on the fourth insulating layer INL4. The pixel electrode PE may be connected to the source electrode SE, for example through the branch electrode BE, through the contact hole CH penetrating the second, third and fourth insulating layers INL2, INL3 and INL4. The fifth insulating layer INL5 covering the pixel electrode PE may be disposed on the fourth insulating layer INL4.

According to the embodiment of the invention, the pixel electrode PE and the common electrode CE included in the first base layer By1 may be disposed on different layers from each other. In addition, the pixel electrode PE and the common electrode may form a horizontal electric field.

The first nanocapsules LC1a included in the first liquid crystal layer LC1 may change (e.g., rotate) a polarization direction of incident light on the basis of an intensity of the electric field between the pixel electrode PE and the common electrode CE. For example, when the intensity of the electric field between the pixel and common electrodes PE and CE is greater than a threshold electric field intensity, the first nanocapsules LC1a may change (e.g., rotate) the polarization direction of the incident light. However, when the intensity of the electric field between the pixel and common electrodes PE and CE is greater than the threshold electric field intensity but is less than the reference electric field intensity, the second nanocapsules LC2a may transmit incident light without changing the incident light (e.g., without changing the polarization direction of the incident light). In other words, the second nanocapsules LC2a do not rotate the polarization direction of the incident light on the basis of the threshold electric field intensity.

For another example, when the intensity of the electric field between the pixel and common electrodes PE and CE is greater than the reference electric field intensity, the electric field may be applied to both the first nanocapsules LC1a and the second nanocapsules LC2a. In this case, the first nanocapsules LC1a may change (e.g., rotate) the polarization direction of the incident light on the basis of an electric field intensity equal to or greater than the reference electric field intensity. In addition, the second nanocapsules LC2a may change (e.g., rotate) the polarization direction of the incident light on the basis of an electric field intensity equal to or greater than the reference electric field intensity. That is, where the intensity of the electric field between the pixel and common electrodes PE and CE is greater than the reference electric field, both the first nanocapsules LC1a and the second nanocapsules LC2a may change the polarization direction of incident light.

FIG. 8 is a table illustrating a gray scale represented from (e.g., displayed by) a display device depending on a data voltage provided to a pixel electrode, according to some embodiments of the invention. FIGS. 9A to 9D are schematic views illustrating a transmission path of light outputted from a light source in accordance with a level of the data voltage illustrated in FIG. 8.

The table of FIG. 8 shows a level of a data voltage VD and a gray scale Gy capable of being displayed from the display panel DP by the level of the data voltage VD. In more detail, the intensity of the electric field between the pixel electrode PE and the common electrode CE may be changed depending on the level of the data voltage VD transmitted to the pixel electrode PE through the data line DLj illustrated in FIG. 6. Here, a ground voltage may be applied to the common electrode CE as the common voltage. In addition, each of the pixels may display a gray scale Gy corresponding to the level of the data voltage VD.

FIGS. 9A to 9D illustrate the light source BLU, the first to third polarizing layers POL1 to POL3 and the first and second liquid crystal layers LC1 and LC2 among the components of the display device DD of FIG. 7 for the purpose of ease and convenience in description and illustration.

Figure 9A:
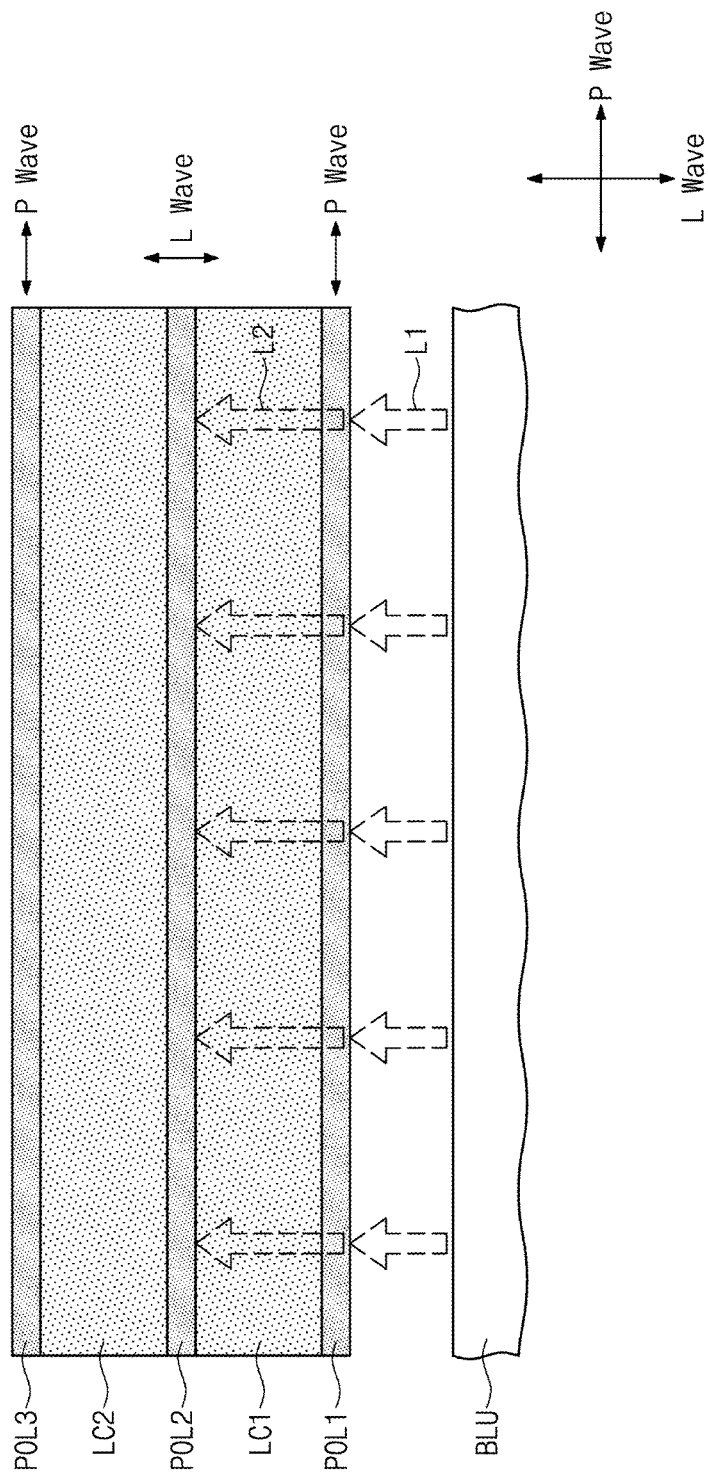
FIGS. 9A-9D are schematic views illustrating a transmission path of light outputted from a light source in accordance with a level of the data voltage illustrated in FIG. 8.

Referring to FIGS. 8 and 9A, the data voltage VD may have a first voltage level V1. The first voltage level V1 is substantially 0V, and thus the data voltage VD is not applied to the pixel electrode PE. In this case, each of the first and second liquid crystal layers LC1 and LC2 transmits incident light without rotating a polarization direction of the incident light.

In more detail, the light source BLU may provide first light L1 having both a polarization direction P parallel to the first polarization axis and a polarization direction L parallel to the second polarization axis to the first polarizing layer POL1. The first polarizing layer POL1 may transmit only the portions of the first light L1 vibrating in the polarization direction P parallel to the first polarization axis. In other words, the first polarizing layer POL1 may transmit only second light L2 having the polarization direction P parallel to the first polarization axis to the first liquid crystal layer LC1.

The second light L2 transmitted through the first polarizing layer POL1 may pass through the first liquid crystal layer LC1 without being changed but may be blocked by the second polarizing layer POL2. In other words, the second light L2 having the polarization direction P parallel to the first polarization axis does not pass through the second polarizing layer POL2 having the second polarization axis. Thus, the display panel DP may display a black color image based on a first gray scale Gy1. Here, the displaying of the black color image substantially means that an image is displayed based on the lowest gray scale value of 0 gray scale to 255 gray scales. In other words, the first gray scale Gy1 may be the lowest gray scale value of 0 gray scale to 255 gray scales.

Figure 9B:
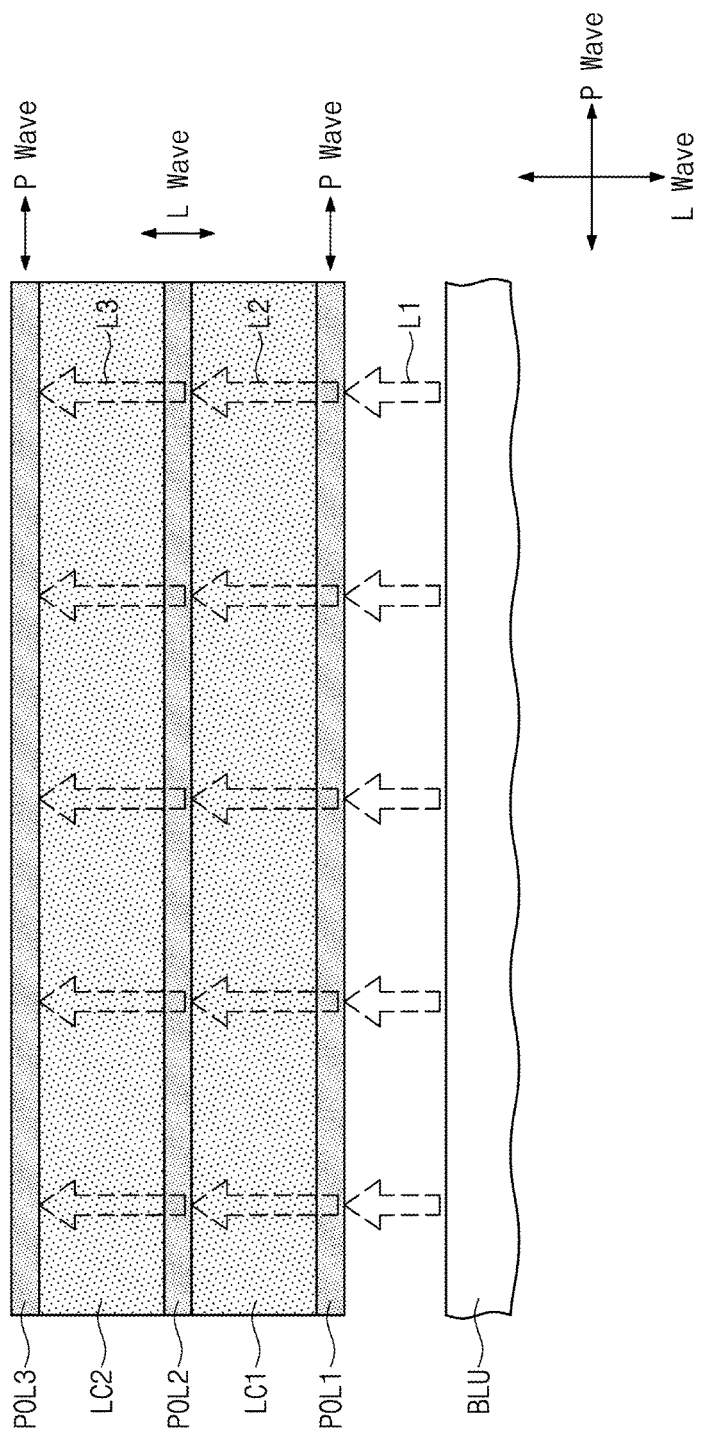

Referring to FIGS. 8 and 9B, the data voltage VD may have a level between a threshold voltage level Vth and a reference voltage level VR. The threshold voltage level Vth and the reference voltage level VR may be higher than the first voltage level V1. The threshold voltage level Vth may be a positive voltage level higher than 0V. Because the data voltage VD of the level higher than the threshold voltage level Vth is applied to the pixel electrode PE, the intensity of the electric field between the pixel electrode PE and the common electrode CE may be higher than the threshold electric field intensity.

In this case, the first liquid crystal layer LC1 may change (e.g., rotate) the polarization direction P of the second light L2 parallel to the first polarization axis by 90 degrees. As a result, the second light L2 may pass through the second polarizing layer POL2. However, the intensity of the electric field between the pixel and common electrodes PE and CE may be higher than the threshold electric field intensity but may be lower than the reference electric field intensity. As a result, third light L3 transmitted through the second polarizing layer POL2 may pass through the second liquid crystal layer LC2 without being changed but may be blocked by the third polarizing layer POL3. Thus, the display panel DP may display the black color image based on the first gray scale Gy1.

Figure 9C:
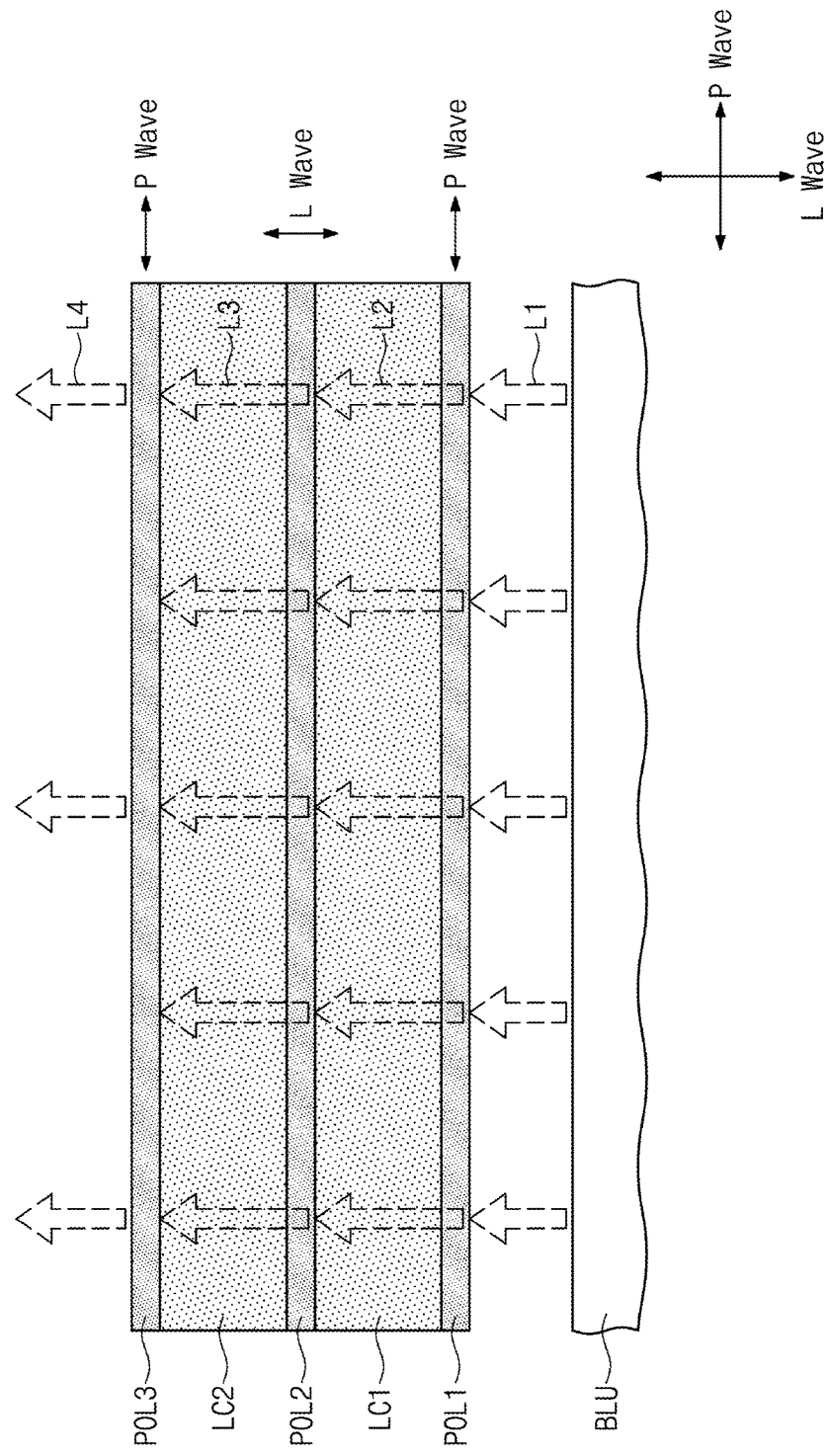

Referring to FIGS. 8 and 9C, the data voltage VD may have a level between the reference voltage level VR and an active voltage level VH. Because the data voltage VD of the level higher than the reference voltage level VR is applied to the pixel electrode PE, the intensity of the electric field between the pixel electrode PE and the common electrode CE may be higher than the reference electric field intensity.

In this case, the second liquid crystal layer LC2 may change (e.g., rotate) the polarization direction L (i.e., parallel to the second polarization axis) of only a portion of the third light L3 by 90 degrees. This may be because the intensity of the electric field is not applied to all of the second nanocapsules LC2a (see FIG. 7) included in the second liquid crystal layer LC2 because the level of the data voltage VD is not higher than the active voltage level VH. Thus, only the portion of the third light L3, which is provided to the second nanocapsules LC2a supplied with the intensity of the electric field, may be rotated by 90 degrees and then may pass through the third polarizing layer POL3. An image of a second gray scale Gy2 higher than the first gray scale Gy1 of the black color may be displayed by fourth light L4 transmitted through the third polarizing layer POL3.

According to the embodiments of the invention, a transmittance of light outputted from the display panel DP may be controlled by adjusting the level of the data voltage VD.

Figure 9D:
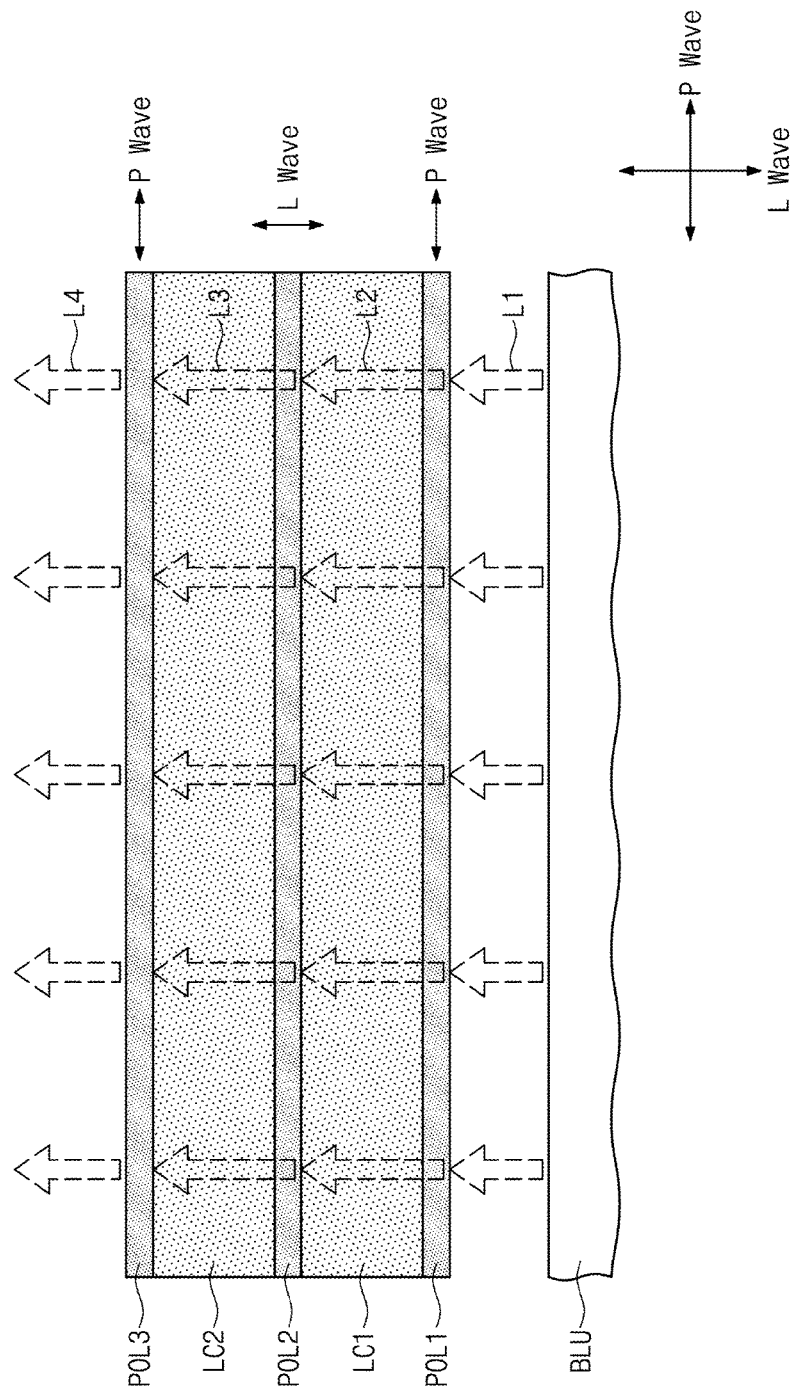

Referring to FIGS. 8 and 9D, the data voltage VD may have a level higher than the active voltage level VH. Because the data voltage VD of the level higher than the active voltage level VH is applied to the pixel electrode PE, the intensity of the electric field between the pixel electrode PE and the common electrode CE may be higher than an active electric field intensity.

In this case, the second liquid crystal layer LC2 may change (e.g., rotate) the polarization direction L of the third light L3 parallel to the second polarization axis by 90 degrees. In other words, the intensity of the electric field may be applied to all of the second nanocapsules LC2a included in the second liquid crystal layer LC2. Thus, the polarization direction L of the third light L3 transmitted through the second polarizing layer POL2 may be rotated by 90 degrees through the second nanocapsules, and the rotated third light L3 may pass through the third polarizing layer POL3. An intensity of fourth light L4 illustrated in FIG. 9D may be greater than an intensity of the fourth light L4 illustrated in FIG. 9C.

An image of the second gray scale Gy2 higher than the first gray scale Gy1 of the black color may be displayed by the fourth light L4 transmitted through the third polarizing layer POL3. For example, the display panel DP may display the white color gray scale in the embodiments illustrated in FIGS. 9C and 9D.

Figure 10:
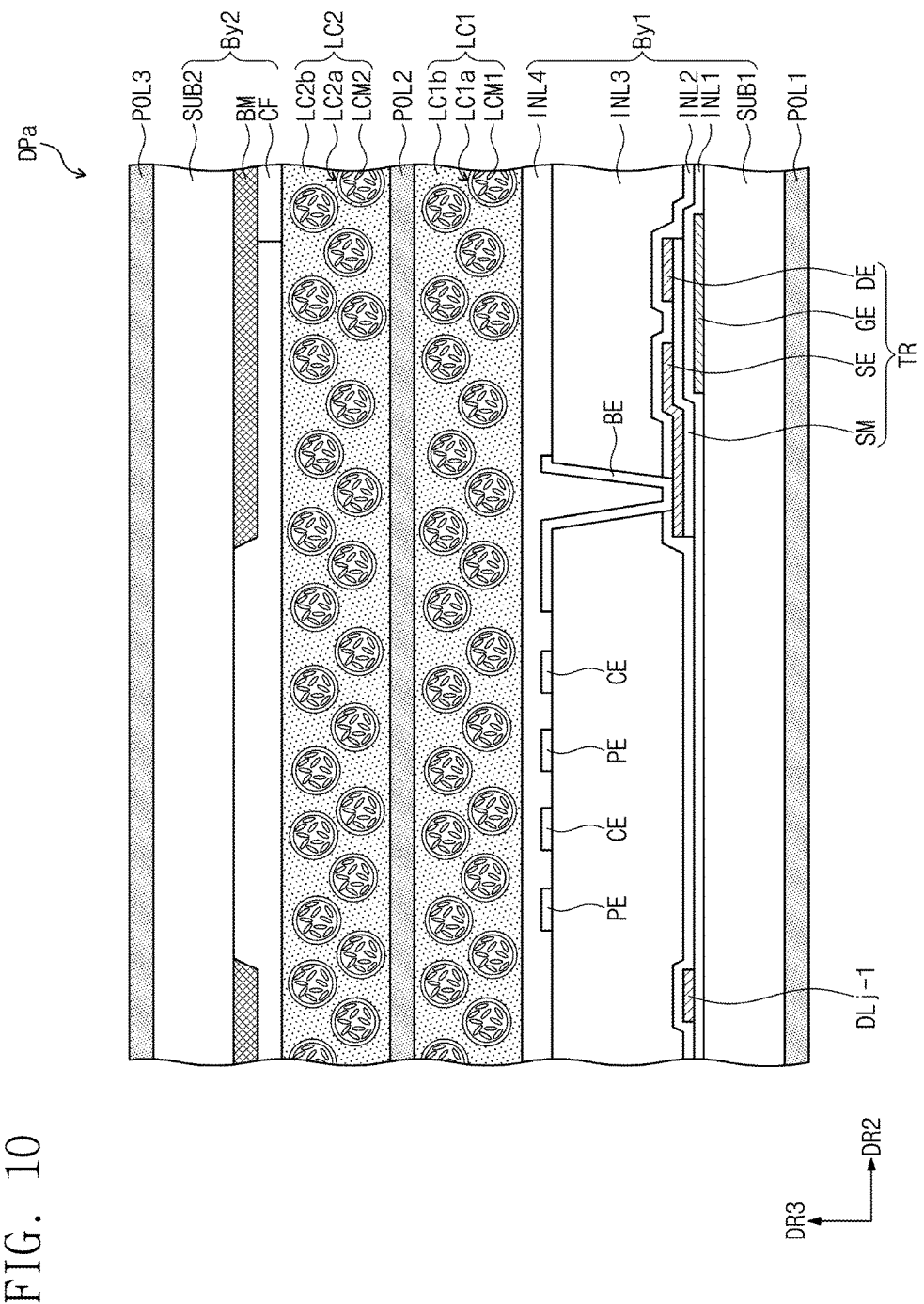
FIG. 10 is a cross-sectional view illustrating a display device according to another embodiment of the invention.

FIG. 10 is a cross-sectional view illustrating a display device according to another embodiment of the invention.

Except for the structures of the pixel and common electrodes PE and CE, the components of a display panel DPa of FIG. 10 may be substantially the same as described with respect to corresponding components of the display panel DP of FIG. 7. Thus, the descriptions of the other components will be omitted.

Referring to FIG. 10, a pixel electrode PE and a common electrode CE may be disposed on the same layer. In more detail, the pixel electrode PE and the common electrode CE may be alternately arranged in the second direction DR2 on the third insulating layer INL3. The fourth insulating layer INL4 may cover the pixel electrode PE and the common electrode CE disposed on the same layer and may be disposed on the third insulating layer INL3.

According to the embodiments of the invention, the display device may display a complete black color in an off-state in which the electric field is not formed between the pixel electrode and the common electrode. In addition, because the two liquid crystal layers are driven using one pixel electrode and one common electrode, a total thickness of the display device may be reduced or minimized.

While the invention has been described with reference to example embodiments, it will be apparent to those skilled in the art that various changes and modifications may be made without departing from the spirit and scope of the invention. Therefore, it should be understood that the above embodiments are not limiting, but illustrative. The scope of the following claims and their equivalents, should not be restricted or limited by the foregoing description.

What is claimed is:

1. A display device comprising:
    a display panel; and
    a light source configured to provide a light to the display panel, wherein the display panel comprises:
        a first polarizing layer, the light being incident on the first polarizing layer;
        a first base layer on the first polarizing layer, the first base layer comprising a pixel electrode and a common electrode;
        a first liquid crystal layer on the first base layer and comprising a plurality of first nanocapsules;
        a second liquid crystal layer on the first liquid crystal layer and comprising a plurality of second nanocapsules;
        a second polarizing layer between the first liquid crystal layer and the second liquid crystal layer;
        a second base layer on the second liquid crystal layer; and
        a third polarizing layer on the second base layer,
    wherein each of the first and second liquid crystal layers controls a transmittance of the light based on an intensity of an electric field between the pixel electrode and the common electrode.

2. The display device of claim 1, wherein the first and third polarizing layers have a first polarization axis parallel to a first direction, and the second polarizing layer has a second polarization axis parallel to a second direction perpendicular to the first direction.

3. The display device of claim 2, wherein the display panel displays a black gray scale when the intensity of the electric field is less than a reference electric field intensity.

4. The display device of claim 3, wherein the light transmitted through the first polarizing layer is blocked by the second polarizing layer when the intensity of the electric field is less than a threshold electric field intensity.

5. The display device of claim 3, wherein, when the intensity of the electric field is less than the reference electric field intensity, the first nanocapsules rotate a polarization direction of the light transmitted through the first polarizing layer to allow the rotated polarization direction to be parallel to the second polarization axis, and the light transmitted through the second polarizing layer is blocked by the third polarizing layer.

6. The display device of claim 2, wherein the display panel displays a color gray scale higher than a black gray scale when the intensity of the electric field is greater than a reference electric field intensity.

7. The display device of claim 6, wherein, when the intensity of the electric field is greater than the reference electric field intensity, the first nanocapsules rotate a first polarization direction of the light transmitted through the first polarizing layer to allow the rotated first polarization direction to be parallel to the second polarization axis, and only some of the second nanocapsules rotate a second polarization direction of the light transmitted through the second polarizing layer to allow the rotated second polarization direction to be parallel to the first polarization axis.

8. The display device of claim 6, wherein, when the intensity of the electric field is greater than the reference electric field intensity, the first nanocapsules rotate a first polarization direction of the light transmitted through the first polarizing layer to allow the rotated first polarization direction to be parallel to the second polarization axis, and the second nanocapsules rotate a second polarization direction of the light transmitted through the second polarizing layer to allow the rotated second polarization direction to be parallel to the first polarization axis.

9. The display device of claim 1, wherein each of the first nanocapsules comprises a plurality of first liquid crystal molecules and each of the second nanocapsules comprises a plurality of second liquid crystal molecules, and wherein the first and second liquid crystal molecules rotate a polarization direction of the light, depending on the intensity of the electric field.

10. The display device of claim 9, wherein a positive dielectric anisotropy of the second nanocapsules is greater than a positive dielectric anisotropy of the first nanocapsules.

11. The display device of claim 9, wherein a refractive index of the second nanocapsules is greater than a refractive index of the first nanocapsules.

12. The display device of claim 1, wherein the pixel electrode and the common electrode are disposed on different layers.

13. The display device of claim 1, wherein the pixel electrode and the common electrode are disposed on the same layer.

14. The display device of claim 1, wherein the light provided from the light source has a first color, and wherein the second base layer comprises a conversion part absorbing the light of the first color to emit light of a color different from the first color.

15. The display device of claim 14, wherein the conversion part comprises:

a first conversion part including a first illuminant emitting light of a second color different from the first color;

a second conversion part including a second illuminant emitting light of a third color different from the second color; and a third conversion part transmitting the light of the first color.

16. The display device of claim 1, wherein the first liquid crystal layer further comprises an organic layer in which the first nanocapsules are dispersed, and wherein the first liquid crystal layer is provided in a film type.

17. The display device of claim 1, wherein the second liquid crystal layer further comprises an organic layer in which the second nanocapsules are dispersed, and wherein the second liquid crystal layer is provided in a film type.

18. The display device of claim 1, wherein a sum of thicknesses of the first to third polarizing layers is equal to or less than 10 μm.

19. A display panel comprising:

a first base layer comprising a pixel electrode and a common electrode;

a first liquid crystal film on the first base layer, the first liquid crystal film comprising a plurality of first nanocapsules and a first buffer layer in which the first nanocapsules are dispersed;

a second liquid crystal film on the first liquid crystal film, the second liquid crystal film comprising a plurality of second nanocapsules and a second buffer layer in which the second nanocapsules are dispersed; and a polarizing layer disposed between the first liquid crystal film and the second liquid crystal film.

20. The display panel of claim 19, wherein a thickness of the polarizing layer is equal to or less than 3 μm.

* * * * *